HENRY L. BROWN.
Spooling Silk.
No. 127,456.  Patented June 4, 1872.
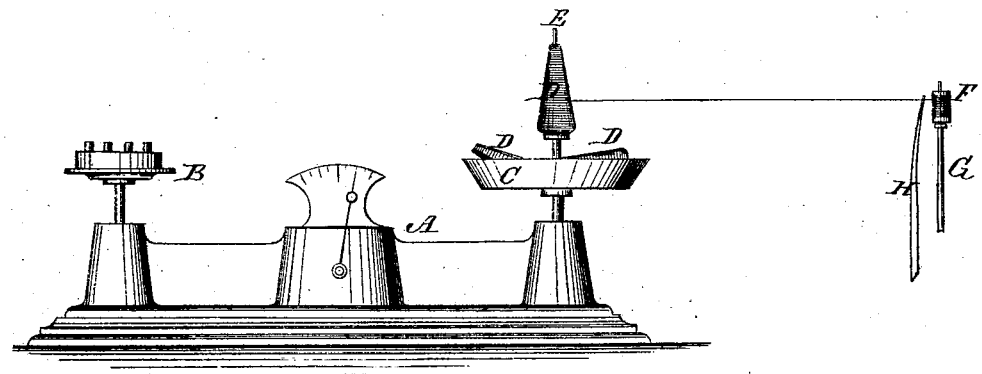

127,456

UNITED STATES PATENT OFFICE.

HENRY L. BROWN, OF MIDDLETOWN, CONNECTICUT.

IMPROVEMENT IN SPOOLING SILK.

Specification forming part of Letters Patent No. 127,456, dated June 4, 1872.

Specification describing a new and useful Improvement in Spooling Silk, invented by HENRY L. BROWN, of Middletown, in the county of Middlesex and State of Connecticut.

In spooling sewing-silk for market it has been heretofore, and is now, the practice to estimate the weight of the silk on the spools, judging by the size, and being guided by weighing batches of the spools from time to time, and taking the average; but the most skillful persons fall considerably short of that accuracy which ought to be attained in this matter, for it is highly desirable that each spool shall have exactly the quantity, by weight, it is designed to have, and no more. To accomplish this I propose to employ a counter-balance scale in connection with the spooling apparatus, placing the bobbins from which the silk is to be drawn for winding upon the spools in one pan, and balancing them by ounce-weights if my spools are to receive an ounce of silk; or, if other quantities, I use weights to correspond, and having a spindle in said pan, containing the bobbins, whereon the bobbin being drawn from may be mounted. I remove one weight after having balanced the silk, and proceed to wind onto the commercial spool until my remaining weights again balance the bobbins; then I remove the completed spool, apply another, and proceed as before, and so on till the silk is wound off from the bobbins and the weights removed.

The drawing is a side elevation of apparatus, showing the manner of carrying out my invention.

A represents the balance-beam of a scale; B, the pan for the weights; and C the pan for containing the bobbins D of silk to be spooled. E is the spindle, arranged in the pan to hold the bobbins, so as to turn freely when the silk is being drawn off from them. F represents the commercial spool, whereon the silk is to be wound in predetermined quantities. G is the spindle for turning it for winding on the silk, and H the traversing-guide for laying the silk on the spool regularly; these may be operated in any approved way.

In case the silk in the pan C is in excess of a number of weights, but not enough for another, I balance this excess with any small objects put on the pan B with the weights, which excess will be added to the next batch of silk put in the pan C. If the arms of the scale or balance are of unequal length I use weights graduated to the proportionate weights of the arms in like manner.

As it is important to have the last coil of silk laid on with more care, and to have this coil extend the whole length of the spool and terminate at the end, I run the silk on the first spool until the pan C rises, and note how much the coil lacks of the end of the spool; then I ascertain the amount of silk, by weight, it takes to complete that coil and another finishing-coil; then I shift the poise of my scale so that the pan C will rise when the spool F is minus this amount; and, after finishing out the coil being wound on, when it does rise I lay on the last finishing-coil, and stop at the end of it, thus insuring the exact weight at the completion of the finishing-coil.

Having thus described my invention, I claim as new and desire to secure by Letters Patent—

1. The mode of determining the weight of thread or silk wound upon a commercial spool by winding from a bobbin on a balance-beam or scale, with the counter-balance adjusted to the weight of the bobbin minus the weight of the thread or silk to be transferred to the commercial spool to be formed, substantially as specified.

2. I also claim the mode of completing the exterior smooth coil simultaneously with the delivery of the complement of weight by having the scale adjusted to rise just before the beginning of the last coil necessary to complete the weight, and running said coil on afterward, all substantially as specified.

HENRY L. BROWN.

Witnesses:
S. OTIS BARROWS,
HENRY J. ROYCE.